J. F. MARX.
WHEEL CONSTRUCTION.
APPLICATION FILED JAN. 28, 1916.
1,209,185.
Patented Dec. 19, 1916.
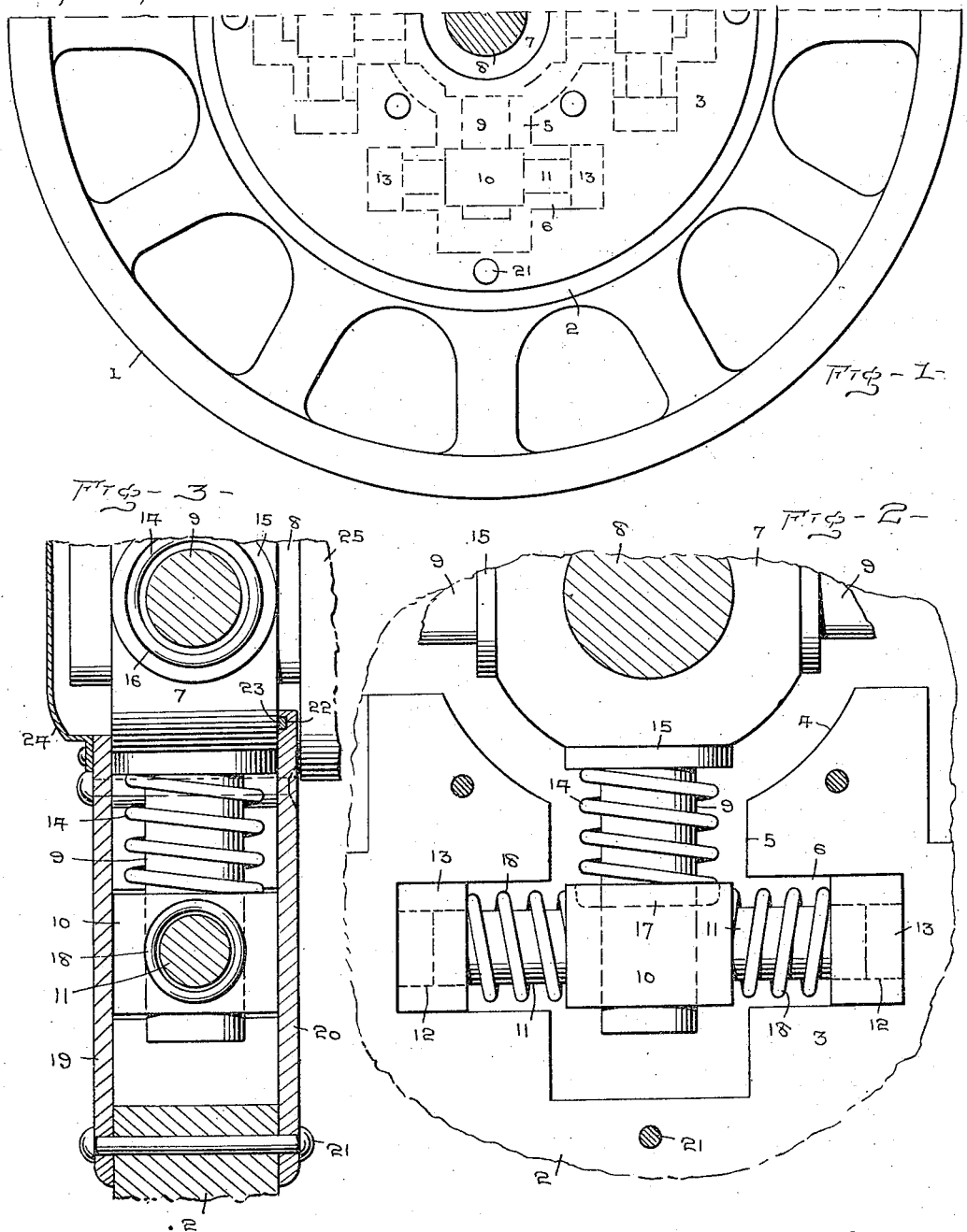

UNITED STATES PATENT OFFICE.

JOE F. MARX, OF HARTINGTON, NEBRASKA.

WHEEL CONSTRUCTION.

1,209,185. Specification of Letters Patent. Patented Dec. 19, 1916.

Application filed January 28, 1916. Serial No. 74,823.

*To all whom it may concern:*

Be it known that I, JOE F. MARX, a citizen of the United States, residing at Hartington, in the county of Cedar and State of Nebraska, have invented certain new and useful Improvements in Wheel Construction; and I do hereby declare the following to be a full, clear, and exact description of the invention, such as will enable others skilled in the art to which it appertains to make and use the same.

My invention relates to new and useful improvements in wheel construction and my object is to provide a main and auxiliary hub for the wheel which parts are independently movable of each other.

A further object is to provide spring members and supporting parts for yieldingly connecting the main and auxiliary hubs together. And a further object is to provide a dust proof oil chamber for retaining oil around the working parts of the main and auxiliary hubs.

Other objects and advantages will be hereinafter set forth and more particularly pointed out in the accompanying specification.

In the accompanying drawings which are made a part of this application, Figure 1 is a detail side elevation of a portion of a wheel structure showing by dotted lines the relative position of the auxiliary hub and its parts with the main hub. Fig. 2 is a detail elevation of a portion of the main and auxiliary hubs and one of the connecting parts, and Fig. 3 is a vertical transverse sectional view through the hub portion of the wheel.

Referring to the drawings in which similar reference numerals designate corresponding parts throughout the several views, 1 indicates the wheel proper which may be constructed in any preferred manner and of any preferred material, said wheel having a main hub 2 extending inwardly from which is a flange 3, said flange having a circular cut-away portion 4 and a plurality of radial and transverse channels 5 and 6 respectively, a transverse channel communicating with each of the radial channels.

Adapted to float within the circular cut away portion 4 of the flange 3 is an auxiliary hub 7 which is mounted upon the usual form of axle 8, which axle extends transversely through the wheel structure, said auxiliary hub having a plurality of radiating spokes 9 which enter the radial channels 5 and freely move therein.

Mounted upon the outer ends of the spokes 9 are blocks 10 which are slidable on the spokes, said blocks having laterally extending bars 11 which enter the transverse channels 6, the outer ends of said bars being slidably mounted in openings 12 of bearings 13 which bearings are of sufficient size to snugly fit the inner ends of the transverse channels.

In order to resiliently suspend the auxiliary hub within the main hub, coil springs 14 are disposed around the spokes 9 between bearing collars 15 on the auxiliary hub and the blocks 10, said collars and auxiliary hubs having channels 16 and 17 respectively in which the ends of the springs are seated. By providing each spoke with a spring it will be readily seen that when a blow is delivered to the wheel the shock will be absorbed by said springs before reaching the auxiliary hub and axle carrying the same, thereby preventing the jar from reaching the body of the vehicle.

In order to overcome the strain upon the wheel incident to starting or stopping the vehicle to which the wheel is attached, coil springs 18 are introduced around the bars 11 between the ends of the blocks 10 and bearings 13 so that when power is applied to the axle, the auxiliary hub will have a slight rotating action independently of the remainder of the wheel, thus eliminating the jar and twisting action prevalent in vehicles as constructed at the present time. The auxiliary hub 7 is held in alinement with the main hub 2 by means of plates 19 and 20 which are placed on opposite sides of the flange 3 and auxiliary hub 7 and are secured to the flange 3 by means of bolts or rivets 21.

The inner face of the plate 20 is provided with a channel 22 in which is positioned a ring 23, said ring engaging the face of the auxiliary hub 7 and preventing the leakage of oil at this point. The opening near the central portion of the plate 19 for the reception of the end of the auxiliary hub 7 is covered by means of a cap 24 which prevents dust, grit and the like from coming in contact with the working parts of the auxiliary hub, said cap being secured to the plate 19 in any suitable manner. By providing the cap 24 and the ring 23, a perfect oil chamber is provided for the working parts of the auxiliary and main hub and by keeping the proper amount of lubricating oil in the chamber so formed the wear upon the parts will be reduced to a minimum.

This device can be very cheaply constructed and readily assembled together and may be applied to use with any of the well known automobiles or motor propelled vehicles without changing the construction of the axle, and as shown in Fig. 3, the brake drum 25 is attached in any suitable manner to the inner end of the auxiliary hub 7. It will likewise be understood that any preferred form of tire may be used in connection with the wheel, either solid rubber or steel tire as the resiliency is provided by the coil springs between the main and auxiliary hubs.

Having thus fully described my invention what I claim as new and desire to secure by Letters Patent of the United States, is:—

A wheel comprising a main hub having a central opening and provided with radial channels communicating therewith, said hub being further provided with additional channels extending transversely to and communicating with the radial channels, a bearing block disposed in each end of the last named channels, a bar embodying an apertured head and having its opposite ends slidably disposed in each of said bearing blocks, a cushion spring arranged on each bar between the said head and the adjacent bearing block, an auxiliary hub provided with spokes disposed within the radial channels, each spoke extending through the apertured head of each bar, and a cushion spring arranged on each spoke between the auxiliary hub and the adjacent bar.

In testimony whereof I have signed my name to this specification in the presence of two subscribing witnesses.

JOE F. MARX.

Witnesses:
R. G. MASON,
LOUIS MARX.

Copies of this patent may be obtained for five cents each, by addressing the "Commissioner of Patents, Washington, D. C."